(12) United States Patent
Hiratsuka et al.

(10) Patent No.: US 10,714,748 B2
(45) Date of Patent: *Jul. 14, 2020

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: SANYO Electric Co., Ltd., Daito-shi, Osaka (JP)

(72) Inventors: Hidekazu Hiratsuka, Osaka (JP); Kaoru Nagata, Osaka (JP); Tsutomu Nishioka, Osaka (JP); Tatsuhiko Suzuki, Osaka (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 173 days.

This patent is subject to a terminal disclaimer.

(21) Appl. No.: 15/915,783

(22) Filed: Mar. 8, 2018

(65) Prior Publication Data

US 2018/0198122 A1 Jul. 12, 2018

Related U.S. Application Data

(62) Division of application No. 14/424,326, filed as application No. PCT/JP2013/006977 on Nov. 27, 2013, now Pat. No. 9,947,924.

(30) Foreign Application Priority Data

Dec. 27, 2012 (JP) ................. 2012-285370

(51) Int. Cl.
| H01M 4/525 | (2010.01) |
| C01G 53/00 | (2006.01) |
| H01M 4/505 | (2010.01) |
| H01M 10/0525 | (2010.01) |
| H01M 4/02 | (2006.01) |

(52) U.S. Cl.
CPC ............ *H01M 4/525* (2013.01); *C01G 53/50* (2013.01); *H01M 4/505* (2013.01); *H01M 10/0525* (2013.01); *C01P 2002/50* (2013.01); *C01P 2002/52* (2013.01); *H01M 2004/021* (2013.01); *H01M 2004/028* (2013.01)

(58) Field of Classification Search
CPC .. H01M 4/525; H01M 4/505; H01M 10/0525; H01M 2004/028; H01M 2004/021; C01G 53/50; C01P 2002/52; C01P 2002/50
See application file for complete search history.

(56) References Cited

U.S. PATENT DOCUMENTS 9,947,924 B2 * 4/2018 Hiratsuka ............ H01M 4/525
2001/0036578 A1 11/2001 Nishida et al.
2005/0220700 A1 10/2005 Suhara et al.
2005/0271944 A1 12/2005 Suhara et al.
2010/0173202 A1 7/2010 Saito et al.
2010/0248040 A1 9/2010 Saito et al.
2010/0276217 A1 11/2010 Sugaya et al.
2012/0135319 A1 5/2012 Saito et al.
2013/0146808 A1 6/2013 Endo et al.
2014/0079990 A1 3/2014 Yanagida et al.

FOREIGN PATENT DOCUMENTS

| JP | 10-308218 A | 11/1998 |
| JP | 2004-220897 A | 8/2004 |
| JP | 2007-220650 A | 8/2007 |
| JP | 2007-257885 A | 10/2007 |
| JP | 2008-152923 A | 7/2008 |
| JP | 2009-32681 A | 2/2009 |
| JP | 2010-129509 A | 6/2010 |
| WO | 2004/082046 A1 | 9/2004 |
| WO | 2009/139157 A1 | 11/2009 |
| WO | 2012/039413 A1 | 3/2012 |
| WO | 2012/165207 A1 | 12/2012 |

OTHER PUBLICATIONS

International Search Report dated Jan. 21, 2014, issued in corresponding application No. PCT/JP2013/006977.
Notification of Transmittal of Translation of the International Preliminary Report on Patentabililty (Form PCT/IB/338) issued in counterpart International Application No. PCT/JP2013/006977 dated Jul. 9, 2015 with Forms PCT/IB/326, PCT/IB/373 and PCT/ISA/237, with English translation. (10 pages).
Office Action dated Nov. 8, 2016, issued in counterpart Japanese Application No. 2014-554091. (3 pages).
Non-Final Office Action dated May 3, 2017, issued in U.S. Appl. No. 14/424,326 (24 pages).
Final Office Action dated Aug. 28, 2017, issued in U.S. Appl. No. 14/424,326 (6 pages).
Notice of Allowance dated Dec. 12, 2017, issued in U.S. Appl. No. 14/424,326 (6 pages).

* cited by examiner

*Primary Examiner* — Laura Weiner

(74) *Attorney, Agent, or Firm* — Westerman, Hattori, Daniels & Adrian, LLP

(57) ABSTRACT

A positive electrode active material for nonaqueous electrolyte secondary batteries, which has high energy density and excellent cycle characteristics. A positive electrode active material for nonaqueous electrolyte secondary batteries of the present invention is represented by general formula $LiNi_xCo_yM_{(1-x-y)}O_2$ (wherein M represents at least one element selected from among metal elements, $0.3 \leq x < 1.0$ and $0 < y \leq 0.5$) and is configured of particles, each of which is an aggregate of crystallites. Each particle has a compressive breaking strength of from 200 MPa to 500 MPa (inclusive), and the crystallite diameter in the vector direction of the particle is from 100 nm to 300 nm (inclusive).

2 Claims, 2 Drawing Sheets

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a Divisional Application of U.S. patent application Ser. No. 14/424,326, filed on Feb. 26, 2015, which is now U.S. Pat. No. 9,947,924 issued on Apr. 17, 2018, which is a national stage application filed under 35 USC 371 of International Application No. PCT/JP2013/006977, filed Nov. 27, 2013, and which is based upon and claims the benefit of priority of the prior Japanese Patent Application No. 2012-285370, filed on Dec. 27, 2012, the entire contents of which are incorporated herein by reference.

TECHNICAL FIELD

The present invention relates to a positive electrode active material for nonaqueous electrolyte secondary batteries and a nonaqueous electrolyte secondary battery.

BACKGROUND ART

In a positive electrode active material used for nonaqueous electrolyte secondary batteries, a phenomenon (cracks in particles) sometimes occurs in which cracks are generated in an active material particle while the expansion and contraction of the particle are repeated associated with charge/discharge cycles. The cracks in particles, when generated, become a cause for bringing about deterioration in performance as a nonaqueous electrolyte secondary battery, such as an increase in internal resistance.

Attempts have been made to enhance compressive breaking strength of a particle for suppressing the cracks in the particle caused by the expansion and contraction. Specifically, the hardness of a particle is enhanced by increasing the size of a crystallite. It is described in Patent Document 1 that the collapse of a crystal structure due to the movement of a Li ion associated with charge/discharge can be suppressed to the minimum by: using a positive electrode active material comprising a particle formed by an aggregate of fine monocrystals called crystallites; making the shapes of the crystallite and the particle almost sterically isotropic; and making the crystallite diameter in the (003) vector direction of the crystallite from 500 to 750 angstroms. Moreover, it is disclosed in Patent Document 2 that an increase in filling amount due to sliding among particles can be achieved and a positive electrode having a high capacity can be obtained by making the compressive breaking strength of the particle high.

CITATION LIST

Patent Literature

Patent Document 1: Japanese Patent Laid-Open Publication No. Hei 10-308218

Patent Document 2: International Publication No. WO 2004/082046

SUMMARY OF INVENTION

Technical Problem

As described above, when the size of the crystallite is made large, the collapse of the crystal structure can be suppressed and the compressive breaking strength of the particle is improved; however, when the size of the crystallite is made too large, the insertion and desorption of the lithium ion is suppressed to bring about the deterioration in capacity.

An advantage of the present invention is to provide a positive electrode active material for nonaqueous electrolyte secondary batteries, the positive electrode active material having a high energy density and an excellent cycle characteristic. Another advantage of the present invention is to provide a nonaqueous electrolyte secondary battery comprising the positive electrode active material.

Solution to Problem

A positive electrode active material for nonaqueous electrolyte secondary batteries according to the present invention is represented by the general formula $LiNi_xCo_yM_{(1-x-y)}O_2$ (where M represents at least one element selected from among metal elements, $0.3 \leq x < 1.0$, and $0 < y \leq 0.5$) and is configured of particles: each being formed by an aggregate of crystallites; each having a compressive breaking strength of 200 MPa or more and 500 MPa or less; and having a crystallite diameter in a (110) vector direction of 100 nm or more and 300 nm or less.

Moreover, a nonaqueous electrolyte secondary battery according to the present invention comprises: a positive electrode comprising the positive electrode active material; a negative electrode; and a nonaqueous electrolyte.

Advantageous Effects of Invention

The positive electrode active material for nonaqueous electrolyte secondary batteries and the nonaqueous electrolyte secondary battery according to the present invention have a high energy density and an excellent cycle characteristic.

DESCRIPTION OF EMBODIMENTS

Hereinafter, an embodiment according to the present invention will be described in detail. In addition, the embodiment shown below is just an example for materializing a technical concept of the present invention, and the present invention is not limited to the embodiment.

Figure 1:
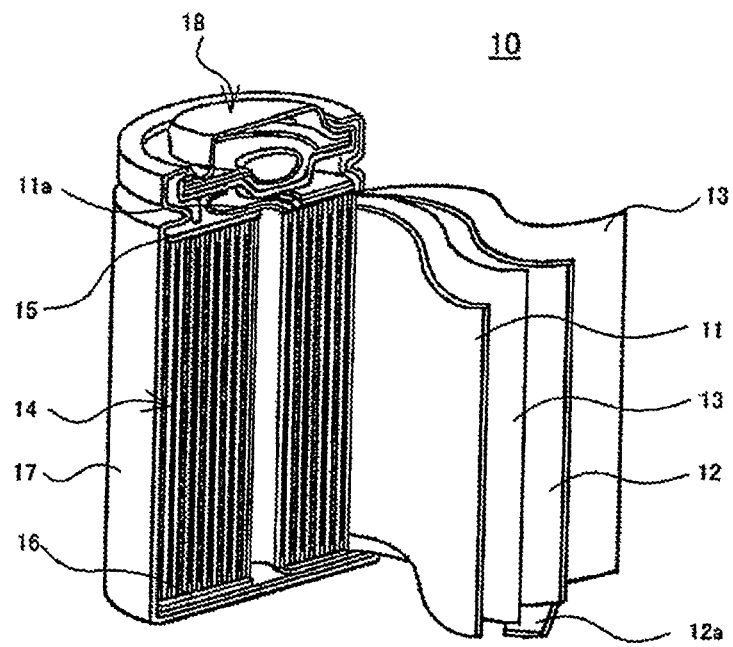
FIG. 1 is a partially cutaway view illustrating an example of a nonaqueous electrolyte secondary battery in the embodiment of the present invention.

FIG. 1 is a partially cutaway view illustrating an example of a nonaqueous electrolyte secondary battery 10 of the embodiment of the present invention. The nonaqueous electrolyte secondary battery 10 comprises: a positive electrode 11 comprising a positive electrode active material; a negative electrode 12; a separator 13 provided between the positive electrode 11 and the negative electrode 12; and a nonaqueous electrolyte comprising a nonaqueous solvent, the nonaqueous electrolyte not shown in FIG. 1. The positive electrode 11 and the negative electrode 12 are wound through the separator 13 to configure a wound electrode body 14. Insulation plates 15 and 16 are disposed on and under the wound electrode body 14, respectively, and the wound electrode body 14 is accommodated inside a battery outer can 17 having a cylindrical shape or the like. The battery outer can 17 is made of, for example, steel that also functions as a negative electrode terminal, and an example of the dimensions of the battery outer can 17 is shown by a diameter of about 18 mm and a height of about 65 mm.

A current-collecting tab 12a for the negative electrode 12 is welded to a bottom part of the inside of the battery outer can 17, and a current-collecting tab 11a for the positive electrode 11 is welded to a bottom plate part of a current-breaking and sealing body 18 in which a safety apparatus is incorporated. A nonaqueous electrolytic solution that is a liquid nonaqueous electrolyte is supplied from an opening of the battery outer can 17 to the inside thereof. After the nonaqueous electrolytic solution is supplied, the battery outer can 17 is sealed by the current-breaking and sealing body 18 comprising a safety valve and a current breaker. The nonaqueous electrolyte secondary battery 10 uses, as terminals for the positive and negative electrodes, the current collecting tabs 11a and 12a of the battery outer can 17 thus sealed and comprises therein: the positive electrode 11; the negative electrode 12; the separator 13; and the nonaqueous electrolyte. Hereinafter, each component member of the nonaqueous electrolyte secondary battery 10 will be described in detail.

[Positive Electrode]

The positive electrode 11 is configured of: the positive electrode current collector such as metal foil; and a positive electrode active material layer formed on the positive electrode current collector. As the positive electrode current collector, there is used foil of a metal that is stable in an electrical potential range of the positive electrode such as aluminum; a film obtained by disposing, on the surface layer thereof, a metal that is stable in an electrical potential range of the positive electrode such as aluminum; or the like. It is preferable that the positive electrode active material layer comprises a conductive agent, a binder, and so on in addition to the positive electrode active material.

The positive electrode active material comprises a lithium complex oxide having a layered salt rock type crystal structure represented by the general formula $LiNi_xCo_yM_{(1-x-y)}O_2$. In the formula, M represents at least one element selected from among metal elements, $0.3 \leq x < 1.0$, and $0 < y \leq 0.5$.

The positive electrode active material that has been put into practical use so far includes $LiCoO_2$; however, $LiNiO_2$ is desirable from the standpoint of cost and increasing capacity, and therefore a larger amount of nickel (Ni) is more preferable. As described above, it is preferable that x is 0.3 or more and less than 1.0. For example, the positive electrode active material may be made as $LiNi_{0.35}Co_{0.35}M_{0.3}O_2$, more preferably $LiNi_{0.5}Co_{0.2}M_{0.3}O_2$.

In addition, the ion radiuses for a Ni ion and a Li ion are about the same in the lithium complex oxide comprising nickel (Ni) within a range of $0.3 \leq x < 1.0$ in general formula (1), and the firing temperature has to be set low and Li has to be added in excess to a certain degree in order to obtain a layered salt rock phase as a stable phase in a synthesis process. It is difficult to enhance the compressive breaking strength of the particle and appropriately adjust the crystallite size as compared with the case where $LiCoO_2$ that has been put into practical use so far is produced in the same manner. The present inventors have found that the controllable ranges of the firing temperature and of the amount of Na are extended by using, as a raw material, the Na ion having a larger ion radius than the Li ion, and thereby the compressive breaking strength of the particle may be enhanced and the crystallite size may be appropriately adjusted for the lithium complex oxide comprising nickel (Ni) within the ranges of $0.3 \leq x < 1.0$ and $0 < y \leq 0.5$ in the general formula.

Moreover, it is preferable from the standpoint of cost and safety that the metal element M comprises manganese (Mn). Moreover, the metal element M may comprise another metal element other than manganese (Mn). Examples of the another metal element include magnesium (Mg), zirconium (Zr), molybdenum (Mo), tungsten (W), aluminum (Al), chromium (Cr), vanadium (V), cerium (Ce), titanium (Ti), iron (Fe), potassium (K), gallium (Ga), and indium (In). Moreover, it is more preferable that the metal element M comprises, in addition to manganese (Mn), at least one selected from among the other metal elements other than manganese (Mn). As another metal element other than manganese (Mn), aluminum (Al) is particularly preferable, from the standpoint of heat stability and so on. For example, it is preferable that the metal element M comprises about 3 mass % of aluminum (Al) based on the total amount of nickel (Ni), cobalt (Co), and the metal element M.

The lithium complex oxide can be manufactured, for example, by performing ion exchange in which sodium in a sodium complex oxide is exchanged with lithium. Examples of the method for performing ion exchange in which sodium is exchanged with lithium include a method of adding a molten salt bed of at least one lithium salt selected from the group consisting of lithium nitrate, lithium sulfate, lithium chloride, lithium carbonate, lithium hydroxide, lithium iodide, lithium bromide, and lithium chloride to a sodium-containing transitional metal oxide. In addition to the method, a method of immersing the sodium-containing transitional metal oxide in a solution comprising at least one of the above-described lithium salts or the like is included.

Next, the lithium complex oxide particle will be described in detail. The lithium complex oxide here is a powder comprising a particle that is formed by an aggregate of crystallites which show the maximum aggregation considered to be a monocrystal; namely, formed by an agglomeration of a large number of crystallites, and the crystallites configure a primary particle, and the particle in which crystallites are gathered means a secondary particle.

From the standpoint of making it possible to increase the filling amount of the positive electrode active material in manufacturing a positive electrode, or the like, it is preferable that the volume average particle diameter (D50) of the particle which is a secondary particle is 5 μm or more and 20 μm or less. The volume average particle diameter (D50) is measured using water as a dispersion medium and using a laser diffraction/scattering type particle size distribution measurement apparatus (product name "LA-750" manufactured by HORIBA, Ltd.). Moreover, the volume average particle diameter (D50) here means a median diameter at which the integrated value by volume becomes 50% in the particle size distribution.

Moreover, the hardness of a particle having the volume average particle diameter (D50) means the degree of closeness among the crystallites configuring the secondary particle, and is evaluated by determining the compressive breaking strength of each particle which is a secondary particle. The compressive breaking strength (St) is calculated by the numerical formula $St=2.8P/\pi d^2$ (in the formula, P represents a load applied to particle, and d represents a particle diameter) described in "Journal of the Mining and Metallurgical Institute of Japan" vol. 81, No. 932, December 1965 issue, p. 1024 to 1030. As shown in the numerical formula, the compressive breaking strength (St) is finally determined by dividing $2.8P/\pi$ by the square of the particle diameter and therefore is highly dependent on the particle diameter, and as a result the compressive breaking strength (St) becomes larger as the particle becomes smaller. Thus, regarding the compressive breaking strength (St), it is preferable to specify the compressive breaking strength (St) at a predetermined particle diameter.

It is preferable that the compressive breaking strength for each of the particles having the volume average particle diameter (D50) described above is 200 MPa or more and 500 MPa or less. Furthermore, from the standpoint of obtaining an effect on the cycle characteristic in charging the non-aqueous electrolyte secondary battery comprising a lithium complex oxide particle to a high battery voltage of about 4.3 to about 4.4 V, it is preferable that the compressive breaking strength is 300 MPa or more and 500 MPa or less. In addition, no particular limitation is imposed on the upper limit of the charged voltage; however, it is more preferable that the upper limit is 4.4 V in increasing the voltage for the purpose of increasing the capacity, and it is preferable from the standpoint of suppressing the decomposition of the nonaqueous electrolyte, or the like that the upper limit is 4.5 V or less.

Moreover, the dimensions of the crystallite can be expressed by: a crystallite diameter in a (003) vector direction that is a direction toward which layers are superimposed in the lithium complex oxide having a layered rock salt type crystal structure; and a crystallite diameter in a (110) vector direction that is a direction perpendicular to the (003) vector direction. Here, the crystallite diameter in the (110) vector direction is evaluated. The crystallite diameter is calculated by determining a powder X-ray diffraction pattern using a powder X-ray diffraction measurement apparatus (product name "D8 ADVANCE" manufactured by Bruker AXS) and analyzing the powder X-ray diffraction pattern by a whole powder pattern decomposition method (hereinafter, referred to as the WPPD method).

The measurement conditions of X-ray diffraction are as follows.
X-ray output: 40 kV×40 mA
Goniometer radius: 250 mm
Divergence slit: 0.6°
Scattering slit: 0.6°
Light-receiving slit: 0.1 mm
Solar slit: 2.5° (incident side and light-receiving side)

The measurement method of the X-ray diffraction is a $2\theta/\theta$ method (measurement is conducted at $2\theta=15$ to 140°, step width 0.01°) with a horizontal sample setting integrated optical device, and the scanning time is set so that the intensity of the main peak ((111) plane) becomes about 10000 counts.

Hereinafter, analysis procedures using the WPPD method will be described. In addition, the value of the crystallite diameter (nm) obtained by other analysis procedures may be different from the value of the crystallite diameter (nm) obtained by the present analysis procedures, but should not be excluded from the scope of the present invention. In the present invention, evaluation should be performed with the value of the crystallite diameter (nm) obtained by the present analysis procedures.

Procedure 1: Start up software (TOPAS) and read measurement data.

Procedure 2: Set Emission Profile. (Select Cu tube bulb and Bragg Brentano focusing geometry.)

Procedure 3: Set background. (Use Legendre's polynomial as Profile function, set the term number to 8 to 20.)

Procedure 4: Set Instrument. (Use Fundamental Parameter, and input Slit conditions, Filament length, and Sample length.)

Procedure 5: Set Corrections. (Use Sample displacement. Use also Absorption when the filling density of the sample to the sample holder is low. In this case, fix Absorption to X-ray absorption coefficient of the measurement sample.)

Procedure 6: Set crystal structure. (Set to Space group R3-m. Use Lattice constant/Crystallite diameter/Lattice strain. Set widening of profile due to crystallite diameter and lattice strain to Lorentzian function.)

Procedure 7: Execute calculation (Refine Background, Sample displacement, Diffraction intensity, Lattice constant, Crystallite diameter, and Lattice strain, and adopt Le-ball equation for calculation.)

Procedure 8: End analysis when the standard deviation of the crystallite diameter is 6% or less of the refined value. Proceed to Procedure 9 when the standard deviation is greater than 6% of the refined value.

Procedure 9: set Widening of profile due to lattice strain to Gaussian function. (Keep setting of crystallite diameter to Lorentzian function.)

Procedure 10: Execute calculation. (Refine Background, Sample displacement, Diffraction intensity, Lattice constant, Crystallite diameter, and Lattice strain.)

Procedure 11: End analysis when the standard deviation of the crystallite diameter is 6% or less of the refined value. Unable to analyze when the standard deviation is greater than 6% of the refined value.

It is preferable, from the standpoint of making it possible to improve ionic conductivity and of realizing a high energy density, or the like that the crystallite diameter in the (110) vector direction of the particle determined in the manner as described above is 100 nm or more and 300 nm or less, and furthermore 150 nm or more and 300 nm or less.

Again, the description is back on the components that configure the positive electrode active material layer, and the conductive agent is used for enhancing the electrical conduction property of the positive electrode active material layer. Conductive agents include carbon materials and so on, such as carbon black, acetylene black, Ketjen black, and graphite. These may be used alone or in combination of two or more.

The binder is used for maintaining a favorable contact state between the positive electrode active material and the conductive agent and enhancing the binding property of the positive electrode active material or the like to the surface of the positive electrode current collector. As the binder, for example, polytetrafluoroethylene (PTFE), polyvinylidene fluoride (PVdF), modified products thereof, and so on are used. The binder may be used together with a thickener such as carboxymethyl cellulose (CMC) or polyethylene oxide (PEO).

[Negative Electrode]

The negative electrode comprises, for example, a negative electrode current collector such as metal foil and a negative electrode active material layer formed on the negative electrode current collector. As the negative electrode current collector, foil of a metal that is stable in an electrical potential range of the negative electrode such as copper, or a film obtained by disposing a metal that is stable in an electrical potential range of the negative electrode such as copper can be used. It is preferable that the negative electrode active material layer comprises a binder in addition to the negative electrode active material which is capable of occluding and desorbing a lithium ion. As the binder, PTFE and so on can be used in the same way as in the case of the positive electrode; however, it is preferable to use a styrene-butadiene copolymer (SBR) or a modified product thereof, and so on. The binder may be used together with a thickener such as CMC.

As the negative electrode active material, natural graphite, artificial graphite, lithium, silicon, carbon, tin, germanium, aluminum, lead, indium, gallium, lithium alloys, carbon and silicon in which lithium is occluded in advance, alloys and mixtures thereof, and so on can be used.

[Nonaqueous Electrolyte]

The nonaqueous electrolyte comprises a nonaqueous solvent and an electrolyte salt dissolved in the nonaqueous solvent. The nonaqueous electrolyte is not limited to a nonaqueous electrolytic solution that is a liquid electrolyte, but may be a solid electrolyte using a gel polymer or the like.

As the nonaqueous solvent, there can be used cyclic carbonic esters that have generally been used as a nonaqueous solvent such as ethylene carbonate (EC), linear esters such as dimethyl carbonate (DMC), carboxylic esters such as γ-butyrolactone (γ-GBL), cyclic ethers such as crown ethers, chain ethers, nitriles, amides, or halogen-substituted compounds in which a hydrogen atom in the above-described nonaqueous solvents is substituted with a halogen atom such as a fluorine atom, and mixed solvents thereof, and so on. Among them, it is preferable to mix and use a cyclic carbonic ester which is a solvent having a high dielectric constant and a chain ester which is a solvent having a low viscosity.

It is preferable that the electrolyte salt is a lithium salt. Lithium salts that have generally been used as a supporting salt in conventional nonaqueous electrolyte secondary batteries can be used as the lithium salt. Specific examples include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m represent an integer of 1 or more), $LiC(C_pF_{2p+1}SO_2)(C_qF_{2q+1}SO_2)(C_rF_{2r+1}SO_2)$ (each of p, q, and r represents an integer of 1 or more), $Li[B(C_2O_4)_2]$ (lithium bis(oxalate)borate (LiBOB)), $Li[B(C_2O_4)F_2]$, $Li[P(C_2O_4)F_4]$, $Li[P(C_2O_4)_2F_2]$, and so on. These lithium salts may be used alone or in combination of two or more.

Moreover, the nonaqueous electrolyte may appropriately comprise an additive. The additive is used for the purpose of forming a favorable coating film on positive and negative electrodes. Examples of the additive include vinylene carbonates (VC), ethylene sulfites (ES), cyclohexylbenzene (CHB), modified products thereof, and so on. The additive may be used alone, or in combination of two or more. The ratio of the additive is not particularly limited; however, about 0.05 to about 10 mass % of the additive based on the nonaqueous electrolyte is preferable.

[Separator]

As the separator 13, for example, a porous sheet having ion permeability and insulation characteristic is used. Specific examples of porous sheet include fine porous thin films, woven fabrics, nonwoven fabrics, and so on. Polyolefins such as polyethylenes and polypropylenes are preferable as a material for the separator 13.

EXAMPLES

Hereinafter, the present invention will specifically be described in detail giving Examples and Comparative Examples; however, the present invention is not limited to the following Examples. The nonaqueous electrolyte secondary batteries 10 having the structure described in FIG. 1 were manufactured to evaluate Examples 1 to 5 and Comparative Examples 1 to 3. The specific method for manufacturing the nonaqueous electrolyte secondary batteries 10 is as follows.

Example 1

[Manufacture of Positive Electrode]

Sodium nitrate ($NaNO_3$), nickel (II) oxide (NiO), cobalt (II, III) oxide ($Co_3O_4$), and manganese (III) oxide ($Mn_2O_3$) were mixed so as to obtain $Na_{0.95}Ni_{0.5}Co_{0.2}Mn_{0.3}O_2$ (charge composition). Thereafter, the mixture was retained at 900° C. for 10 hours to obtain a sodium-containing transition metal oxide.

A molten salt bed obtained by mixing lithium nitrate ($LiNO_3$) and lithium hydroxide (LiOH) so that the ratio of lithium nitrate ($LiNO_3$) to lithium hydroxide (LiOH) expressed by mol % became 1:39 was added in an amount of 5 times the equivalent (25 g) to 5 g of the obtained sodium-containing transition metal oxide. Thereafter, the mixture was retained at 200° C. for 10 hours, thereby performing ion exchange in which part of sodium in the sodium-containing transition metal oxide was exchanged with lithium. Further, the substance after the ion exchange was washed with water to obtain a lithium complex oxide.

The crystal structure for the obtained lithium-containing complex oxide was analyzed and identified by powder X-ray diffractometry (powder XRD measurement apparatus RINT 2200 (radiation source Cu-Kα) manufactured by Rigaku Corporation was used; the same hereinafter). The obtained crystal structure was assigned to a layered rock salt type crystal structure. Moreover, the composition of the lithium-containing transition metal oxide was calculated by ICP emission analysis (ICP emission analysis apparatus iCAP 6300 manufactured by Thermo Fisher Scientific K.K. was used; the same hereinafter) to find $Li_{0.98}Ni_{0.5}Co_{0.2}Mn_{0.3}O_2$.

The lithium complex oxide thus obtained, represented by the general formula $Li_{0.98}Ni_{0.5}Co_{0.2}Mn_{0.3}O_2$ and having a volume average particle diameter of 5 μm or more and 20 μm or less, was used as a positive electrode active material.

The positive electrode active material represented by $Li_{0.98}Ni_{0.5}Co_{0.2}Mn_{0.3}O_2$, a carbon powder serving as a conductive agent, and a polyvinylidene fluoride powder serving as a binder were mixed so as to be contained in 92 mass %, 5 mass %, and 3 mass % respectively, and the resultant mixture was mixed with a N-methyl-2-pyrrolidone (NMP) solution to prepare a slurry. The slurry was applied by a doctor blade method on both surfaces of a current collector made of aluminum and having a thickness of 15 μm to form a positive electrode active material layer. Thereafter, the positive electrode active material layer was compressed with a compression roller, and the short side length was set to 55 mm and the long side length to 600 mm to make a positive electrode of Example 1.

[Manufacture of Negative Electrode]

Three kinds of graphite; natural graphite, artificial graphite, and artificial graphite whose surface is covered by amorphous carbon, were prepared as the negative electrode active material, and a negative electrode active material obtained by blending these kinds was used. The negative electrode 12 was manufactured in the following manner. First of all, the negative electrode active material, a styrene-butadiene copolymer serving as a binder, and carboxymethyl cellulose serving as a thickener were mixed so as to be contained in 98 mass %, 1 mass %, and 1 mass %, respectively, then the resultant mixture was mixed with water to prepare a slurry, and the slurry was applied by a doctor blade method on both surfaces of a current collector made of copper and having a thickness of 10 μm to form a negative electrode active material layer. Thereafter, the negative electrode active material layer was compressed to a predetermined density with a compression roller, and the short side length was set to 57 mm and the long side length to 620 mm to manufacture a negative electrode.

[Manufacture of Nonaqueous Electrolyte]

In a nonaqueous solvent obtained by mixing equal volumes of ethylene carbonate (EC) and diethyl carbonate (DEC), 1.6 mol/L of $LiPF_6$ serving as an electrolyte salt was dissolved to make a nonaqueous electrolytic solution that is a nonaqueous electrolyte, and the nonaqueous electrolytic solution was used for manufacturing a battery.

[Manufacture of Battery]

A nonaqueous electrolyte secondary battery 10 having the structure described in FIG. 1 was manufactured by the following procedures using the positive electrode, the negative electrode, and the nonaqueous electrolytic solution thus manufactured. Namely, a wound electrode body 14 was manufactured by winding the positive electrode 11 and the negative electrode 12 both manufactured in the manner as described above through the separator 13. Next, the insulation plates 15 and 16 were disposed on and under the wound electrode body 14, respectively, and the wound electrode body 14 was accommodated inside the battery outer can 17, functioning also as a negative electrode terminal, being made of steel, and having a cylindrical shape with a diameter of 18 mm and a height of 65 mm. The current-collecting tab 12a for the negative electrode 12 was welded to the bottom part of the inside of the battery outer can 17, and the current-collecting tab 11a for the positive electrode 11 was welded to the bottom plate part of the current-breaking and sealing body 18 in which a safety apparatus was incorporated. The nonaqueous electrolytic solution was supplied from an opening of the battery outer can 17, and thereafter the battery outer can 17 was sealed by the current-breaking and sealing body 18 comprising a safety valve and a current breaker.

The rated capacity of the nonaqueous electrolyte secondary battery 10 thus obtained was 1200 mAh. In addition, every nonaqueous electrolyte secondary battery 10 of Examples 1 to 5 and Comparative Examples 1 to 3 was made so as to satisfy the negative electrode capacity/the positive electrode capacity=1.1.

Example 2

A battery to be used in Example 2 was manufactured by the same manufacturing method as in Example 1 except that the method for obtaining a sodium-containing transition metal oxide in the method for producing a positive electrode active material in Example 1 was changed to a method for obtaining a sodium-containing transition metal oxide through retention at 1000° C. for 10 hours.

Example 3

In the method for producing a positive electrode active material in Example 1, sodium nitrate ($NaNO_3$), nickel (II) oxide (NiO), cobalt (II, III) oxide ($Co_3O_4$), and manganese (III) oxide ($Mn_2O_3$) were mixed so as to obtain $Na_{0.80}Ni_{0.5}Co_{0.2}Mn_{0.3}O_2$ (charge composition). Thereafter, a battery to be used in Example 3 was manufactured by the same manufacturing method as in Example 1 except that the method for obtaining a sodium-containing transition metal oxide was changed to a method for obtaining a sodium-containing transition metal oxide through retaining the mixture at 1000° C. for 10 hours.

Example 4

A battery to be used in Example 4 was manufactured by the same manufacturing method as in Example 1 except that the method for obtaining a sodium-containing transition metal oxide in the method for producing a positive electrode active material in Example 1 was changed to a method for obtaining a sodium-containing transition metal oxide through retention at 1050° C. for 10 hours.

Example 5

A battery to be used in Example 5 was manufactured by the same manufacturing method as in Example 1 except that the method for obtaining a sodium-containing transition metal oxide in the method for producing a positive electrode active material in Example 1 was changed to a method for obtaining a sodium-containing transition metal oxide through retention at 800° C. for 10 hours.

Comparative Example 1

A battery to be used in Comparative Example 1 was manufactured by the same manufacturing method as in Example 1 except that the method for obtaining a sodium-containing transition metal oxide in the method for producing a positive electrode active material in Example 1 was changed to a method for obtaining a sodium-containing transition metal oxide through retention at 750° C. for 10 hours and that the method for producing a positive electrode active material was changed.

Comparative Example 2

In the method for producing a positive electrode active material in Example 1, sodium nitrate ($NaNO_3$), nickel (II) oxide (NiO), cobalt (II, III) oxide ($Co_3O_4$), and manganese (III) oxide ($Mn_2O_3$) were mixed so as to obtain $Na_{1.00}Ni_{0.5}Co_{0.2}Mn_{0.3}O_2$ (charge composition). Thereafter, a battery to be used in Comparative Example 2 was manufactured by the same manufacturing method as in Example 1 except that the method for obtaining a sodium-containing transition metal oxide was changed to a method for obtaining a sodium-containing transition metal oxide by retaining the mixture at 1050° C. for 10 hours.

Comparative Example 3

In the method for producing a positive electrode active material in Example 1, sodium nitrate ($NaNO_3$), nickel (II) oxide (NiO), cobalt (II, III) oxide ($Co_3O_4$), and manganese (III) oxide ($Mn_2O_3$) were mixed so as to obtain $Na_{0.80}Ni_{0.5}Co_{0.2}Mn_{0.3}O_2$ (charge composition). Thereafter, a battery to be used in Comparative Example 3 was manufactured by the same manufacturing method as in Example 1 except that the method for obtaining a sodium-containing transition metal oxide was changed to a method for obtaining a sodium-containing transition metal oxide by retaining the mixture at 1100° C. for 10 hours.

[Measurement of Charge/Discharge Cycle Characteristic]

Each battery of Examples 1 to 5 and Comparative Examples 1 to 3 was charged until the battery voltage became 4.35 V at a constant current, 2It=2400 mA, at 25° C., and discharged until the battery voltage became 2.5 V at a constant current, 2It=2400 mA, after the battery voltage reached 4.35 V. The discharge capacity during the discharge was defined as the initial capacity. Moreover, the above-described charge/discharge was defined as 1 cycle, the cycle was repeated 500 times, and the capacity retention ratio after 500 cycles was determined as the charge/discharge cycle characteristic by dividing the discharge capacity at 500 cycles by the discharge capacity at 1 cycle and then multiplying the resultant value by 100.

The compressive breaking strength, the crystallite diameter in the (110) vector direction, the initial capacity, and the capacity retention ratio after 500 cycles for Examples 1 to 5 and Comparative Examples 1 to 3 are shown together in Table 1.

TABLE 1

|  | Compressive breaking strength (MPa) | Crystallite diameter (nm) | Initial capacity (mAh/g) | Capacity retention ratio (%) |
|---|---|---|---|---|
| Example 1 | 239.37 | 149.6 | 167.7 | 83.7 |
| Example 2 | 355.24 | 299.6 | 153.9 | 93.3 |
| Example 3 | 311.58 | 230.4 | 166.5 | 90.1 |
| Example 4 | 499.89 | 299.6 | 150.7 | 95.0 |
| Example 5 | 200.38 | 110.5 | 167.8 | 80.1 |
| Comparative Example 1 | 154.01 | 106.7 | 166.0 | 60.5 |
| Comparative Example 2 | 450.07 | 394.9 | 135.6 | 92.2 |
| Comparative Example 3 | 520.01 | 299.9 | 149.3 | 70.1 |

Figure 2:
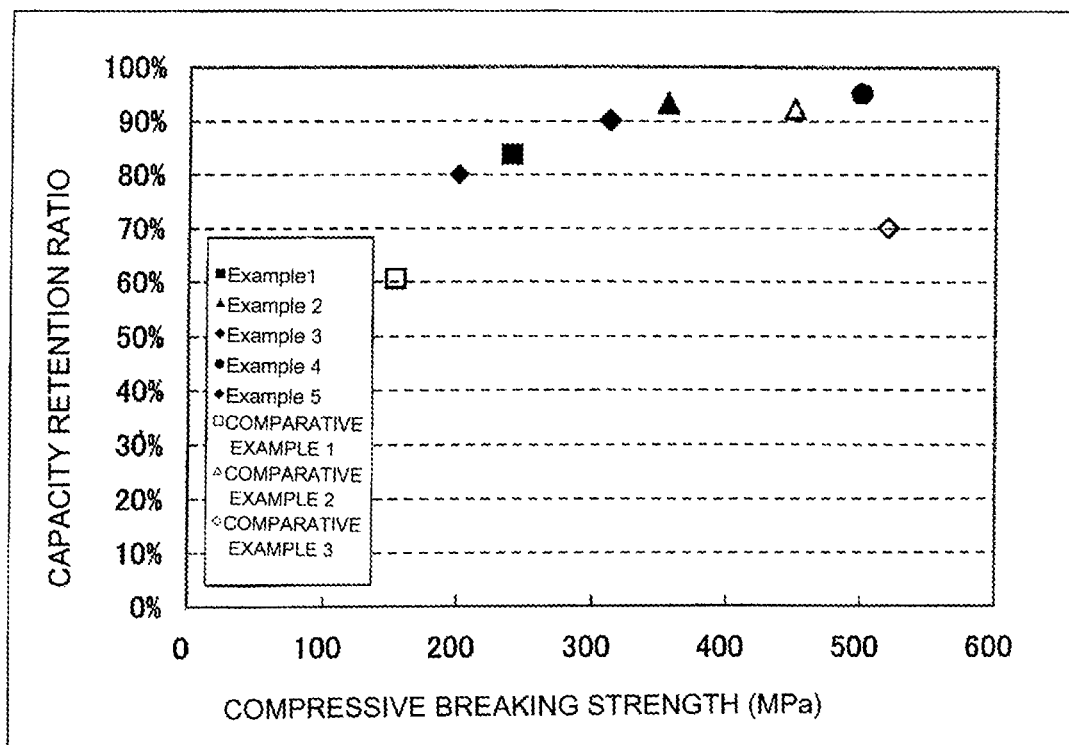
FIG. 2 is a view showing correlation between compressive breaking strength and capacity retention ratio for Examples and Comparative Examples.

FIG. 2 shows the correlation between the compressive breaking strength and the capacity retention ratio for Examples 1 to 5 and Comparative Example 1 to 3. It is understood from FIG. 2 that any of Examples 1 to 5 exhibits an excellent cycle characteristic as compared with Comparative Examples 1 to 3. Namely, a favorable cycle characteristic was obtained by using a lithium complex oxide particle having a compressive breaking strength of 200 MPa or more and 500 MPa or less. Moreover, the capacity retention ratio in Comparative Example 1 where the compressive breaking strength was lower than that in Example 5 was about 60%, and the capacity retention ratio in Comparative Example 3 where the compressive breaking strength was higher than that in Example 4 was about 70% to find that the capacity retention ratio was lowered when the compressive breaking strength was outside the range of 200 MPa or more and 500 MPa or less. The reason is considered as follows: when the compressive breaking strength is 200 MPa or less, the degree of closeness among primary particles, as hardness of the particles, is low and therefore the primary particles are gathered coarsely in the same manner as the conventional primary particles and cracks are liable to be generated in the particles. Thus, it is considered that, by forming a secondary particle which is in a dense state without voids from a coarse state formed by the primary particles, there was obtained the secondary particle having an appropriate hardness, a particle which is a secondary particle and is hard to be crushed even during the process in which the insertion and desorption of lithium in the active material were repeated by the charge/discharge cycles, and therefore has a good cycle characteristic. Moreover, it is not necessarily clear that the reason why the cycle characteristic is lowered when the secondary particle is too hard; however, it is inferred that the secondary particle which is too hard becomes a factor of deterioration because the reaction area of a powder becomes too small in association with the increase in the degree of powder sintering and the surface resistance with the nonaqueous electrolytic solution rises to impair the supply performance of a Li ion.

Moreover, when the particle having a hardness within the above-described range is manufactured, the crystallite diameter in the (110) vector direction becomes about 500 nm to about 600 nm to lower the moving velocity of lithium and suppress the insertion and desorption of lithium, causing the deterioration in capacity. Therefore, the crystallite diameter in the (110) direction is required to be made small. However, when the crystallite diameter in the (110) vector direction is too small, the space in which lithium can be inserted becomes small and therefore the capacity becomes small.

Figure 3:
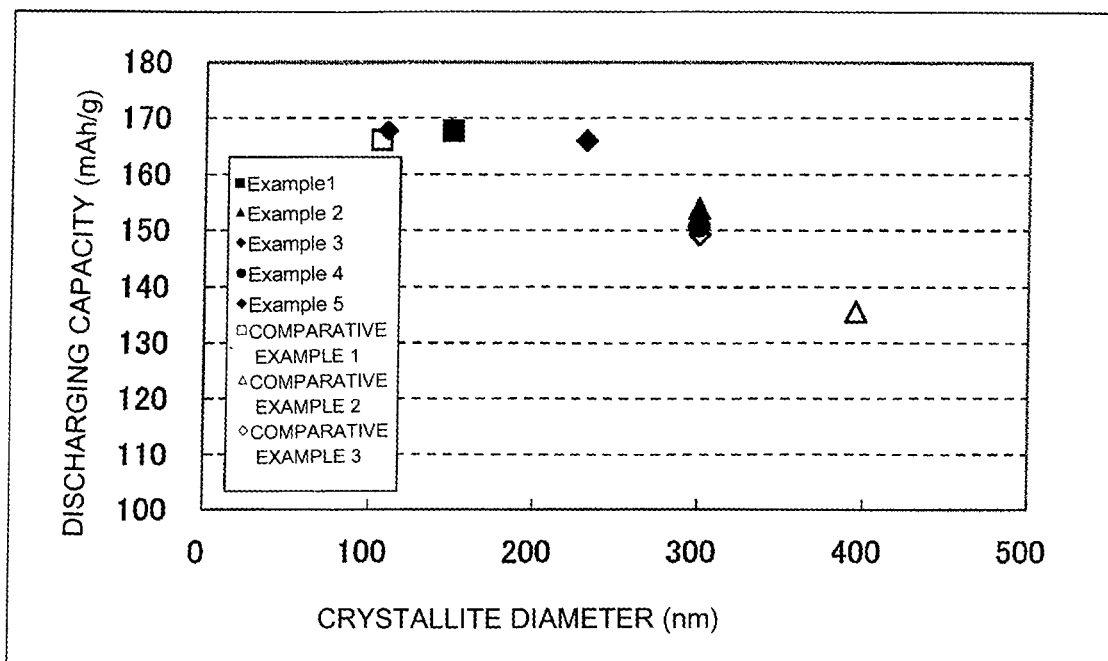
FIG. 3 is a view showing correlation between the crystallite diameter in a (110) vector direction and initial discharge capacity for Examples and Comparative Examples.

FIG. 3 shows the correlation between the crystallite diameter in the (110) vector direction and the initial discharge capacity for Examples 1 to 5 and Comparative Examples 1 to 3. In Comparative Example 2, a hard particle having a compressive breaking strength of 450 MPa was used and the capacity retention ratio was a favorable value of 92%; however, the initial capacity was 135.6 mAh/g, which is not considered to be a favorable result taking into consideration the charge amount of the positive electrode active material of the battery having a rated capacity of 1200 mAh. In the present Examples, positive electrode active materials having a high capacity were able to be obtained by making the crystallite diameter 100 nm or more and 300 nm or less, while appropriately adjusting the hardness of particles with the method for producing a positive electrode active material, the method found by the present inventors.

As has been described, the nonaqueous electrolyte secondary battery 10 provided with a positive electrode active material comprising a lithium complex oxide particle having a compressive breaking strength of 200 MPa or more and 500 MPa or less and having a crystallite diameter in the (110) vector direction of 100 nm or more and 300 nm or less has a high energy density and an excellent cycle characteristic.

REFERENCE SIGNS LIST

10 Nonaqueous electrolyte secondary battery
11 Positive electrode
11a, 12a Current collecting tab
12 Negative electrode
13 Separator
14 Wound electrode body
15, 16 Insulation plate
17 Battery outer can
18 Current-breaking and sealing body.

The invention claimed is:

1. A positive electrode active material to be used for nonaqueous electrolyte secondary batteries,
  wherein the positive electrode active material is represented by the general formula $LiNi_xCo_yM_{(1-x-y)}O_2$ (where M consists of Mn or Mn and at least one of the group consisting of magnesium (Mg), zirconium (Zr), molybdenum (Mo), tungsten (W), aluminum (Al), chromium (Cr), vanadium (V), cerium (Ce), titanium (Ti), iron (Fe), potassium (K), gallium (Ga) and indium (In), $0.3 \leq x < 1.0$, and $0 < y \leq 0.5$) and is configured of secondary particles each being formed by an aggregate of primary particles configured of crystallites, each secondary particle having a compressive breaking strength of 200 MPa or more and 500 MPa or less, and having a crystallite diameter in a (110) vector direction of 100 nm or more and 300 nm or less;

wherein all the crystallites of the primary particles forming said each secondary particle are a same crystal structure, and wherein a volume average particle diameter (D50) of the secondary particle is 5 μm or more and 20 μm or less.

2. A nonaqueous electrolyte secondary battery comprising:

a positive electrode comprising a positive electrode active material, a negative electrode, and a nonaqueous electrolyte, wherein the positive electrode active material is represented by the general formula $LiNi_xCo_yM_{(1-x-y)}O_2$ (where M consists of Mn or Mn and at least one of the group consisting of magnesium (Mg), zirconium (Zr), molybdenum (Mo), tungsten (W), aluminum (Al), chromium (Cr), vanadium (V), cerium (Ce), titanium (Ti), iron (Fe), potassium (K), gallium (Ga) and indium (In), $0.3 \leq x < 1.0$, and $0 < y \leq 0.5$) and is configured of secondary particles each being formed by an aggregate of primary particles configured of crystallites, each secondary particle having a compressive breaking strength of 200 MPa or more and 500 MPa or less, and having a crystallite diameter in a (110) vector direction of 100 nm or more and 300 nm or less;

wherein all the crystallites of the primary particles forming said each secondary particle are a same crystal structure, and wherein a volume average particle diameter (D50) of the secondary particle is 5 μm or more and 20 μm or less.

* * * * *